United States Patent [19]

Brack

[11] 4,446,326
[45] May 1, 1984

[54] CATIONIC NAPTHOLACTAM DYESTUFFS

[75] Inventor: Alfred Brack, Odenthal, Fed. Rep. of Germany

[73] Assignee: Bayer Aktiengesellschaft, Leverkusen, Fed. Rep. of Germany

[21] Appl. No.: 307,255

[22] Filed: Sep. 30, 1981

[30] Foreign Application Priority Data

Oct. 16, 1980 [DE] Fed. Rep. of Germany ....... 3039116

[51] Int. Cl.³ .............................................. C09B 57/06
[52] U.S. Cl. .................................... 548/438; 542/414; 542/424
[58] Field of Search ................ 548/438; 542/414, 424

[56] References Cited

U.S. PATENT DOCUMENTS 3,278,551 10/1966 Kleiner et al. ...................... 548/438
3,299,092 1/1967 Brack ................................... 548/438
4,203,722 5/1980 Brack et al. ............................ 8/467

*Primary Examiner*—Paul M. Coughlan, Jr.
*Assistant Examiner*—D. B. Springer
*Attorney, Agent, or Firm*—Sprung, Horn, Kramer & Woods

[57] ABSTRACT

Cationic dyestuffs of the general formula

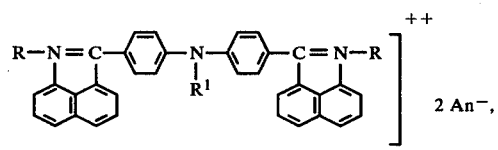

wherein

R represents hydrogen or an alkyl radical with a maximum of 8 C atoms, which is optionally substituted by non-ionic radicals, $R^1$ represents hydrogen or an alkyl radical with a maximum of 4 C atoms, which is optionally substituted by non-ionic radicals, and An⁻ represents an anion, and wherein the benzene rings and naphthalene rings can contain non-ionic radicals which are customary in dyestuff chemistry, are used for dyeing natural and synthetic cationically dyeable fibres, and paper.

4 Claims, No Drawings

CATIONIC NAPTHOLACTAM DYESTUFFS

The present invention relates to new cationic dyestuffs of the formula

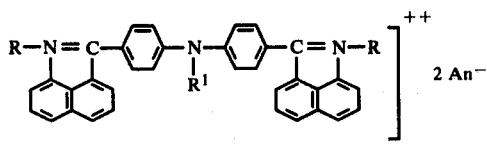

wherein

R represents hydrogen or an alkyl radical with a maximum of 8 C atoms, which is optionally substituted by non-ionic radicals, $R^1$ represents hydrogen or an alkyl radical with a maximum of 4 C atoms, which is optionally substituted by non-ionic radicals, and An⁻ represents an anion, and wherein the benzene rings and naphthalene rings can contain non-ionic radicals which are customary in dyestuff chemistry, and a process for the preparation of these dyestuffs and their use for dyeing paper pulp, cationically dyeable fibres of polymers and copolymers of acrylonitrile and of dicyanoethylene, and acid-modified fibres of polyamides and polyesters.

Halogen atoms, nitrile groups, carboxylic acid ester groups, carboxamide groups, hydroxyl, acyloxy, alkoxy, aralkoxy and aryloxy groups and the analogous mercapto groups, amino groups and amino groups which are monosubstituted or disubstituted by alkyl, aralkyl, aryl, cycloalkyl or acyl groups, acyl and sulphonyl radicals, sulphonamide groups and modification products thereof, such as the sulphamidine groups described in DE-OS (German Published Specification) No. 2,128,326, and—on rings —nitro and alkyl groups are particularly suitable non-ionic substituents within the scope of this invention; however carboxyl groups, which dissociate to a very small extent in the neutral and acid pH range, and therefore do not affect the cationic character of the dyestuffs, are also suitable.

Dyestuffs of the formula

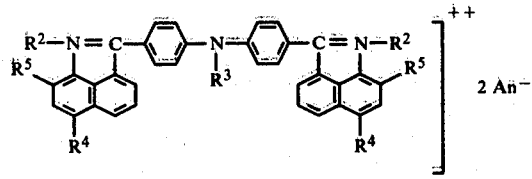

wherein $R^2$ represents hydrogen, $C_1$- to $C_4$-alkyl, which can be substituted by cyano, hydroxyl, $C_1$- to $C_4$-alkoxy, chlorine, $C_1$- to $C_4$-alkoxycarbonyl, aminocarbonyl, mono-$C_1$- to $C_4$-alkylaminocarbonyl or di-$C_1$- to $C_4$-alkylaminocarbonyl, $R^3$ represents hydrogen or $C_1$- to $C_4$-alkyl and $R^4$ represents hydrogen, chlorine, bromine, $C_1$- to $C_4$-alkylcarbonylamino, benzoylamino, methylsulphonylamino, phenylsulphonylamino, $C_1$- to $C_4$-alkylsulphonyl, phenylsulphonyl, aminosulphonyl, mono-$C_1$- to $C_4$-alkylaminosulphonyl, di-$C_1$- to $C_4$-alkylaminosulphonyl, monophenylaminosulphonyl, diphenylaminosulphonyl, $C_1$- to $C_4$-alkylmercapto, in which the alkyl radical can be substituted by carboxyl, $C_1$- to $C_4$-alkoxycarbonyl, hydroxyl, methoxy or ethoxy, phenylmercapto, carboxyl, cyano or a radical of the formulae

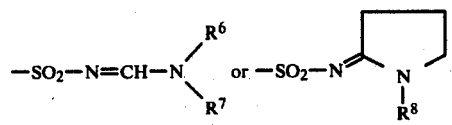

$R^5$ represents hydrogen, chlorine or bromine, $R^6$ and $R^7$ represent $C_1$- to $C_4$-alkyl, phenyl or benzyl, or, together with the nitrogen, represent a pyrrolidine, piperidine or morpholine ring, $R^8$ represents hydrogen, $C_1$- to $C_4$-alkyl, phenyl or benzyl and An⁻ represents an anion, and wherein the phenyl radicals mentioned can be substituted by $C_1$- to $C_4$-alkyl, chlorine, bromine, hydroxyl or $C_1$- to $C_4$-alkoxy, are to be emphasised.

Those dyestuffs of the formula II are preferred, wherein $R^2$ represents hydrogen, methyl, ethyl, propyl, butyl, β-cyanoethyl, β-hydroxyethyl, β-alkoxyethyl, β-chloroethyl, methoxycarbonylethyl, ethoxycarbonylethyl, methoxycarbonylmethyl or ethoxycarbonylmethyl, $R^3$ represents hydrogen, methyl or ethyl, and $R^4$ represents hydrogen, chlorine, bromine, acetamino, methylsulphonylamino, phenylsulphonylamino, $C_1$- to $C_4$-alkylsulphonyl, phenylsulphonyl, aminosulphonyl, mono-$C_1$- to $C_4$-alkylaminosulphonyl, di-$C_1$- to $C_4$-alkylaminosulphonyl, monophenylaminosulphonyl, diphenylaminosulphonyl, $C_1$- to $C_4$-alkylmercapto, in which the alkyl radical can be substituted by carboxyl, methoxycarbonyl, ethoxycarbonyl, hydroxyl, methoxy or ethoxy, or represents phenylmercapto or cyano, $R^5$ represents hydrogen, $R^6$ and $R^7$ represent methyl or phenyl, $R^8$ represents hydrogen or methyl, and An⁻ represents an anion, and wherein the phenyl radicals mentioned can be substituted by methyl or chlorine.

Preferable dyestuffs of the abovementioned group are those in which $R^3$ represents hydrogen, and particularly preferable dyestuffs are those of the formula

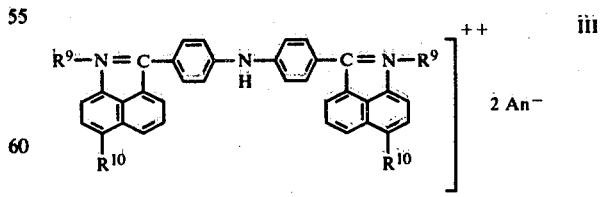

wherein $R^9$ represents methyl, ethyl or β-cyanoethyl and $R^{10}$ represents hydrogen, chlorine or bromine.

The new dyestuffs are prepared by condensation of a naphtholactam derivative of the formula

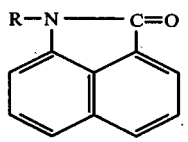

wherein

R has the meaning given at the beginning of the text, and the naphthalene ring can be substituted in the manner described, with a diphenylamine derivative of the formula

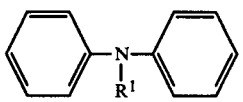

wherein

R¹ has the meaning given at the beginning of the text, and the benzene rings can be substituted in the manner described, the p-positions, however, both being unsubstituted, in a known manner, using at least 2 mols of IV for 1 mol of V. This condensation is most advantageously carried out in excess phosphorus oxychloride, with addition of phosphorus pentoxide, at temperatures between about 100° C. and the boiling point of the mixture.

The new dyestuffs have a very high cellulose affinity, making it possible to dye even lignin-free, bleached cellulose, with almost quantitative uptake of the dyestuff. The waste liquors produced consequently contain no dyestuff or almost no dyestuff. The dyeings are distinguished by good fastness properties to light.

The dyestuffs are also suitable for dyeing, printing and spin-dyeing of materials which predominantly or completely consist of polyacrylonitrile or its copolymers with other vinyl monomers, such as vinylidene cyanide, vinylidene chloride, vinyl chloride, vinyl acetate, vinyl alcohol, acrylic acid esters or methacrylic acid esters, or of acid-modified polyesters or polyamides. The dyeings and prints obtained are distinguished by good general fastness properties, in particular by good fastness to light, wet processing and perspiration, by a high affinity for the fibre, and by a high pH stability.

The parts given in the examples which follow are parts by weight.

EXAMPLE 1

197 parts of N-ethyl-1,8-naphtholactam, 84.5 parts of diphenylamine, 800 parts of phosphorus oxychloride and 200 parts of phosphorus pentoxide are heated for 10 hours to 100°–105° C. After the solution has cooled, it is poured into 7,500 parts of water. The pH value is adjusted to about 4 by addition of the required amount of sodium hydroxide solution or potassium hydroxide solution. The dyestuff of the formula

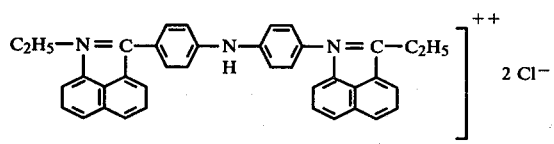

which is formed separates out in crystalline form. The yield is almost quantitative. The dyestuff can, if desired, easily be purified by recrystallisation from water. It dyes paper pulp strongly red-tinged blue, with good fastness to light. The waste liquor is scarcely coloured.

If 280 parts of 4-bromo-N-ethyl-1,8-naphtholactam are used instead of the N-ethyl-naphtholactam, the dyestuff of the formula

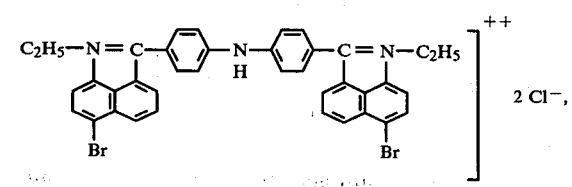

is obtained, with, likewise, practically quantitative yield, in an otherwise unchanged procedure; this dyestuff dyes paper pulp clear blue, with good fastness to light. The waste liquor remains uncoloured.

EXAMPLE 2

331 parts of the naphtholactam derivative of the formula

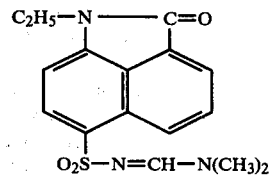

and 98 parts of N-ethyl-diphenylamine are heated with 700 parts of phosphorus oxychloride and 100 parts of phosphorus pentoxide for 15 hours to about 105° C. The working-up is effected according to the data of Example 1. The dyestuff of the formula

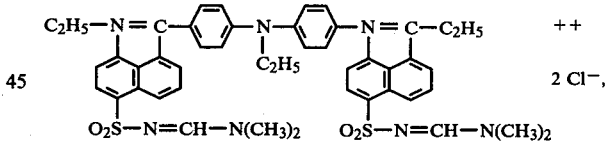

is obtained with about 95% yield, and it dyes paper pulp blue, with good fastness to light.

If one of the following compounds is used as the naphtholactam derivative, in an equivalent amount in each case, similar dyestuffs are obtained, in an otherwise unchanged procedure:

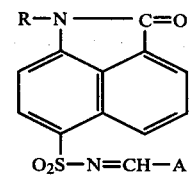

| Example | R | A |
|---------|---|---|
| 3 | CH₃ | N(CH₃)₂ |
| 4 | CH₂CH₂CN | " |

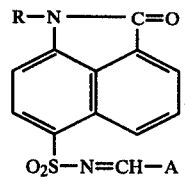

| Example | R | A |
|---|---|---|
| 5 | C₂H₅ | 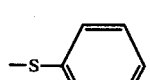 |
| 6 | " | 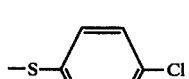 |
| 7 | " | 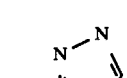 |

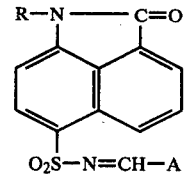

| Example | R | A |
|---|---|---|
| 8 | " | 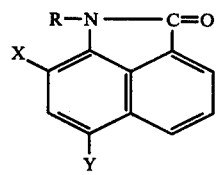 |

If the reaction is carried out according to the process of Example 1, using in each case 1 mol of one of the following naphtholactam derivatives, the corresponding dyestuffs of the formula I are obtained, which give paper dyeings fast to light, and yield waste liquors almost free of dyestuff:

| Example | R | Y | X | Shade |
|---|---|---|---|---|
| 9 | H | H | H | blue-violet |
| 10 | CH₃ | " | " | " |
| 11 | CH₂CH₂CN | " | " | strongly red-tinged blue |
| 12 | CH₂CH₂OH | " | " | very strongly red-tinged blue |
| 13 | CH₂COOCH₃ | " | " | red-tinged blue |
| 14 | CH₂CH₂COOC₂H₅ | " | " | " |
| 15 | n-C₃H₇ | " | " | blue-violet |
| 16 | n-C₄H₉ | " | " | " |
| 17 | i-C₅H₁₁ | " | " | " |
| 18 | CH₃ | Cl | " | red-tinged blue |
| 19 | " | " | Cl | blue |
| 20 | C₂H₅ | " | H | red-tinged blue |
| 21 | " | —SO₂N(CH₃)₂ | " | blue |
| 22 | " | Br | Br | blue |
| 23 | CH₃ | CN | H | red-tinged blue |
| 24 | C₂H₅ | SCH₂COOH | " | blue |
| 25 | " | SCH₂CH₂OH | " | " |
| 26 | " | –S–C₆H₅ | " | green-tinged blue |
| 27 | " | –S–C₆H₄–Cl | " | " |
| 28 | " | –S–(triazole) | " | " |
| 29 | " | CH₃SO₂— | " | blue |

-continued

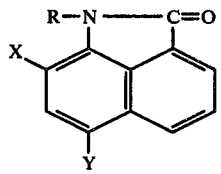

| Example | R | Y | X | Shade |
|---|---|---|---|---|
| 30 | " | ![benzene-SO2-] | " | " |
| 31 | " | OCH₃ | " | blue-violet |
| 32 | " | NHCOCH₃ | " | blue |
| 33 | " | N(CH₃)₂ | " | green-tinged blue |
| 34 | " | COOH | " | red-tinged blue |
| 35 | CH₃OCH₂CH₂— | Br | " | " |
| 36 | " | " | Br | blue |
| 37 | CH₂=CH—CH₂— | " | H | " |
| 38 | C₂H₅ | SO₂—N=CH—N(CH₃)₂ | " | " |
| 39 | " | SO₂—N=CH—N(CH₃)(C₆H₅) | " | " |
| 40 | " | SO₂—N=CH—N(CH₃)(CH₂C₆H₅) | " | " |
| 41 | " | SO₂—N=CH—N(piperidine) | " | " |
| 42 | " | SO₂—N=CH—N(morpholine) | " | " |

EXAMPLE 43

0.5 part of the dyestuff of the formula:

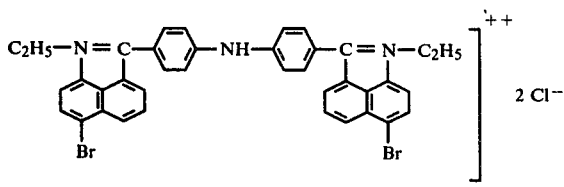

is dissolved in 100 parts of a 28% strength solution of an acid-modified polyacrylonitrile in dimethylformamide. The homogenised solution is then spun according to a dry spinning proccess which is customary in the art and is generally known. Intensely reddish-tinged blue filaments are obtained, which are distinguished by excellent fastness properties, in particular fastness to light, abrasion, wet processing and steaming.

If the fibre preparation is carried out according to one of the customary wet spinning processes, an equally good result is obtained. The precipitating and stretching baths are virtually not coloured, because the dyestuff does not bleed.

Instead of the dyestuff chloride, the equivalent amount of the acetate or lactate can also be employed. For even deeper dyeings, these salts are to be preferred on account of their greater ease of dissolution.

I claim:
1. Cationic dyestuffs of the formula

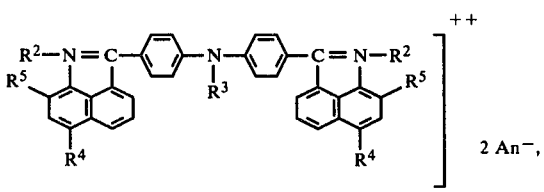

wherein
$R^2$ represents hydrogen, $C_1$- to $C_4$-alkyl, which can be substituted by cyano, hydroxyl, $C_1$- to $C_4$-alkoxy, chlorine, $C_1$- to $C_4$-alkoxycarbonyl, aminocarbonyl, mono-$C_1$- to $C_4$-alkylaminocarbonyl or di-$C_1$- to $C_4$-alkylaminocarbonyl,
$R^3$ represents hydrogen or $C_1$- to $C_4$-alkyl and
$R^4$ represents hydrogen, chlorine, bromine, $C_1$- to $C_4$-alkylcarbonylamino, benzoylamino, methylsulphonylamino, phenylsulphonylamino, $C_1$- to $C_4$-alkylsulphonyl, phenylsulphonyl, aminosulphonyl, mono-$C_1$- to $C_4$-alkylaminosulphonyl, di-$C_1$- to $C_4$-alkylaminosulphonyl, monophenylaminosulphonyl, diphenylaminosulphonyl, $C_1$- to $C_4$-alkylmercapto, in which the alkyl radical can be substituted by carboxyl, $C_1$- to $C_4$-alkoxycarbonyl, hydroxyl, methoxy or ethoxy, or represents phenylmercapto, carboxyl, cyano or a radical of the formulae

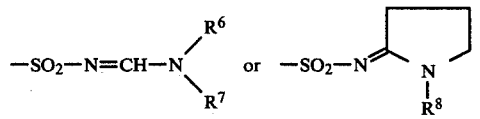

$R^5$ represents hydrogen, chlorine or bromine,
$R^6$ and $R^7$ represent $C_1$- to $C_4$-alkyl, phenyl or benzyl, or, together with the nitrogen, represent a pyrrolidine, piperidine or morpholine ring,
$R^8$ represents hydrogen, $C_1$- to $C_4$-alkyl, phenyl or benzyl and
$An^-$ represents an anion, and wherein
the phenyl radicals mentioned can be substituted with nonsterically hindering $C_1$- to $C_4$-alkyl, chlorine, bromine, hydroxyl or $C_1$- to $C_4$-alkoxy.

2. Cationic dyestuffs according to claim 1, wherein $R^2$ represents hydrogen, methyl, ethyl, propyl, butyl, β-cyanoethyl, β-hydroxyethyl, β-alkoxyethyl, β-chloroethyl, methoxycarbonylethyl, ethoxycarbonylethyl, methoxycarbonylmethyl or ethoxycarbonylmethyl, $R^3$ represents hydrogen, methyl or ethyl, and
$R^4$ represents hydrogen, chlorine, bromine, acetamino, methylsulphonylamino, phenylsulphonylamino, $C_1$- to $C_4$-alkylsulphonyl, phenylsulphonyl, aminosulphonyl, mono-$C_1$- to $C_4$-alkylaminosulphonyl, di-$C_1$- to $C_4$-alkylaminosulphonyl, monophenylaminosulphonyl, diphenylaminosulphonyl, $C_1$- to $C_4$-alkylmercapto, in which the alkyl radical can be substituted by carboxyl, methoxycarbonyl, ethoxycarbonyl, hydroxyl, methoxy or ethoxy, or represents phenylmercapto or cyano,
$R^5$ represents hydrogen,
$R^6$ and $R^7$ represent methyl or phenyl,
$R^8$ represents hydrogen or methyl, and
$An^-$ represents an anion, and wherein
the phenyl radicals mentioned can be substituted by methyl or chlorine.

3. Cationic dyestuffs according to claim 2, wherein $R^3$ represents hydrogen.

4. Cationic dyestuffs of the formula

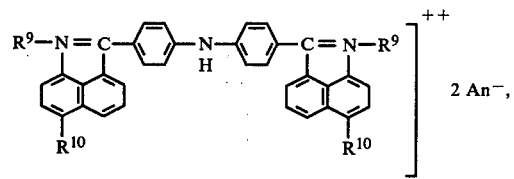

wherein
$R^9$ represents methyl, ethyl or β-cyanoethyl, and
$R^{10}$ represents hydrogen, chlorine or bromine.

* * * * *